United States Patent
McMillan et al.

(10) Patent No.: US 7,533,148 B2
(45) Date of Patent: May 12, 2009

(54) FRAMEWORK TO ENABLE INTEGRATION OF ANTI-SPAM TECHNOLOGIES

(75) Inventors: Bruce A. McMillan, Sammamish, WA (US); Andrew J. Wallace, Bellevue, WA (US); Neil K. Koorland, Issaquah, WA (US); Qiang Wang, Redmond, WA (US); Simon P. Attwell, Sammamish, WA (US); Samuel J. Neely, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1378 days.

(21) Appl. No.: 10/706,368

(22) Filed: Nov. 12, 2003

(65) Prior Publication Data

US 2004/0139165 A1 Jul. 15, 2004

Related U.S. Application Data

(63) Continuation-in-part of application No. 10/339,508, filed on Jan. 9, 2003, now Pat. No. 7,171,450.

(51) Int. Cl.
G06F 15/16 (2006.01)
(52) U.S. Cl. .................................................. 709/206
(58) Field of Classification Search .................. 709/206
See application file for complete search history.

(56) References Cited

U.S. PATENT DOCUMENTS

| | | | | |
|---|---|---|---|---|
| 6,023,723 A * | 2/2000 | McCormick et al. | ........ | 709/206 |
| 6,052,709 A | 4/2000 | Paul | | |
| 6,161,130 A * | 12/2000 | Horvitz et al. | .............. | 709/206 |
| 6,199,102 B1 * | 3/2001 | Cobb | ......................... | 709/206 |
| 6,321,267 B1 | 11/2001 | Donaldson | | |
| 6,393,465 B2 * | 5/2002 | Leeds | ......................... | 709/207 |
| 6,615,242 B1 | 9/2003 | Riemers | | |
| 6,654,787 B1 * | 11/2003 | Aronson et al. | ............. | 709/206 |
| 6,732,149 B1 * | 5/2004 | Kephart | ...................... | 709/206 |
| 6,732,157 B1 | 5/2004 | Gordon et al. | | |
| 6,772,196 B1 | 8/2004 | Kirsch et al. | | |
| 6,868,498 B1 | 3/2005 | Katsikas | | |
| 6,901,398 B1 | 5/2005 | Horvitz et al. | | |

(Continued)

FOREIGN PATENT DOCUMENTS

GB 2366706 A 3/2002

(Continued)

OTHER PUBLICATIONS

U.S. Appl. No. 10/180,565, filed Jun. 26, 2002, Goodman.

(Continued)

Primary Examiner—Kenny S Lin
Assistant Examiner—Brian P Whipple
(74) Attorney, Agent, or Firm—Senniger Powers LLP

(57) ABSTRACT

A method that enables multiple spam detection solutions to be deployed in a manageable and rational manner to determine if a message is spam is presented. A framework invokes anti-spam filters to analyze the message and return confidence levels of whether a message is spam. The framework evaluates the highest confidence level against a set of defined thresholds. If the highest confidence level is greater than the highest threshold set by the administrator, the action specified for the highest threshold is taken. The highest confidence level is also compared against all thresholds and the action associated with the nearest threshold that has been exceeded is taken.

23 Claims, 5 Drawing Sheets

U.S. PATENT DOCUMENTS

| | | |
|---|---|---|
| 6,931,433 B1 | 8/2005 | Ralston et al. |
| 6,965,919 B1 | 11/2005 | Woods et al. |
| 6,971,023 B1 * | 11/2005 | Makinson et al. ........... 713/193 |
| 2002/0029248 A1 | 3/2002 | Cook et al. |
| 2002/0116463 A1 | 8/2002 | Hart |
| 2002/0181703 A1 | 12/2002 | Logan et al. |
| 2002/0199095 A1 * | 12/2002 | Bandini et al. .............. 713/151 |
| 2003/0028767 A1 | 2/2003 | Bickford et al. |
| 2003/0229672 A1 | 12/2003 | Kohn |
| 2004/0003283 A1 * | 1/2004 | Goodman et al. ........... 713/201 |
| 2004/0015554 A1 | 1/2004 | Wilson |
| 2004/0024823 A1 | 2/2004 | Del Monte |
| 2004/0093384 A1 | 5/2004 | Shipp |
| 2004/0260922 A1 * | 12/2004 | Goodman et al. ........... 713/154 |
| 2005/0055410 A1 | 3/2005 | Landsman et al. |
| 2005/0080855 A1 | 4/2005 | Murray |
| 2005/0080856 A1 | 4/2005 | Kirsch |
| 2005/0081059 A1 * | 4/2005 | Bandini et al. .............. 713/201 |
| 2005/0102366 A1 | 5/2005 | Kirsch |

FOREIGN PATENT DOCUMENTS

| | | |
|---|---|---|
| GB | 2373130 A | 9/2002 |
| KR | 20030078979 A | 10/2003 |
| WO | 03010680 A1 | 2/2003 |
| WO | 03054764 A1 | 7/2003 |

OTHER PUBLICATIONS

U.S. Appl. No. 10/208,150, filed Jul. 29, 2002, Andaker.

U.S. Appl. No. 09/497,992, filed Feb. 4, 2000, Maller.

Russian Federal Service on Industrial Property, Patents and Trademarks (Rospatent) Decision on Grant issued in Application No. 2005120667/09 (023349) dated Oct. 22, 2008 (English translation), 6 pages.

* cited by examiner

FRAMEWORK TO ENABLE INTEGRATION OF ANTI-SPAM TECHNOLOGIES

CROSS-REFERENCE TO RELATED PATENT APPLICATIONS

This patent application is a continuation-in-part of copending U.S. patent application Ser. No. 10/339,508, filed Jan. 9, 2003.

FIELD OF THE INVENTION

This invention relates generally to electronic messaging and, more particularly, relates to filtering undesired electronic mail.

BACKGROUND OF THE INVENTION

Electronic messaging, particularly electronic mail ("e-mail") carried over the Internet, is rapidly becoming not only quite pervasive in society but also, given its informality, ease of use and low cost, a preferred method of communication for many individuals and organizations.

Unfortunately, e-mail recipients are increasingly being subjected to unsolicited mass mailings. With the growth of Internet-based commerce, a wide and growing variety of electronic merchandisers are repeatedly sending unsolicited mail advertising their products and services to an ever-expanding universe of e-mail recipients. Most consumers who order products or otherwise transact with a merchant over the Internet expect to and, in fact, do regularly receive such solicitations from those merchants.

However, electronic mailers are continually expanding their distribution lists to reach an increasing number of recipients. For example, recipients who merely provide their e-mail addresses in response to perhaps innocuous appearing requests for visitor information generated by various web sites often receive unsolicited mail and much to their displeasure, they find that they have been included on electronic distribution lists. This occurs without the knowledge, let alone the assent, of the recipients. Furthermore, an electronic mailer will often disseminate its distribution list, whether by sale, lease or otherwise, to another such mailer for its use, and so forth with subsequent mailers. Consequently, over time, e-mail recipients often find themselves increasingly barraged by unsolicited mail resulting from separate distribution lists maintained by a wide and increasing variety of mass mailers. An individual can easily receive hundreds, and even thousands, of pieces of unsolicited e-mail over the course of a year. Individuals on e-distribution lists can expect to receive a considerably larger number of unsolicited messages over a much shorter period of time.

Furthermore, while many unsolicited e-mail messages are benign, such as offers for discount office or computer supplies, mortgage rate quotes, or invitations to attend conferences of one type or another, others, such as pornographic, inflammatory and abusive material, are offensive to their recipients. These unsolicited messages are known as "junk" mail or as "spam." The e-mail load from spam can be equivalent to the load generated from legitimate e-mail.

Similar to the task of handling junk postal mail, an e-mail recipient must sift through his incoming mail to remove the spam. The computer industry recognized this problem and has developed techniques to automate the removal of spam. For example, one technique is turf lists. E-mail recipients subscribe to turf lists, which identifies and refuses to accept mail using a defined rule based set of characteristics. Unfortunately, the choice of whether a given e-mail message is spam or not is highly dependent on the particular recipient and the actual content of the message. What may be spam to one recipient may not be spam to another, which limits the functionality of turf lists. Additionally, an electronic mailer (i.e., a spam generator) will prepare a message such that its true content is not apparent from its subject line and can only be discerned from reading the body of the message.

Another technique developed is known as a black hole list. The black hole list is a list of known spam addresses from which spam is sent. The e-mail sender's address is checked against the black hole list. If the address is on the list, the e-mail is not accepted. Spam generators simply change their address to bypass this technique. Other techniques have also been developed. None of the techniques are 100% effective. Innovations by e-mail servers to prevent spam are met with innovations by spam creators to overcome the innovations.

BRIEF SUMMARY OF THE INVENTION

The present invention provides a framework that enables multiple spam detection solutions to be deployed to work together in a manageable and rational manner and enables new innovations to be created and deployed under a rapid deployment model.

A method is presented that determines if an e-mail message is spam using anti-spam modules. The method invokes one of the anti-spam modules and receives a spam confidence level from the anti-spam module. A tuning factor may be applied to the spam confidence level to create a tuned spam confidence level. The highest spam confidence level is compared to at least one threshold. If the highest spam confidence level is greater than the threshold, an action associated with the at least one threshold is invoked.

In one embodiment, a plurality of thresholds including a top threshold is used and the highest spam confidence level is compared to each threshold. If the highest spam confidence level is higher than one or more of the thresholds, the action associated with the threshold that has been exceeded that is closest to the top threshold is invoked.

The actions invoked includes dropping a connection if the highest spam confidence level exceeds a first threshold level, returning a non-delivery message to a sender if the highest spam confidence level exceeds a second threshold level and is below the first threshold level, delivering the message to a junk mail folder if the highest spam confidence level exceeds a third threshold level and is below the second threshold level and sending the highest spam confidence level to the client to allow the client to perform per-user customized actions.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
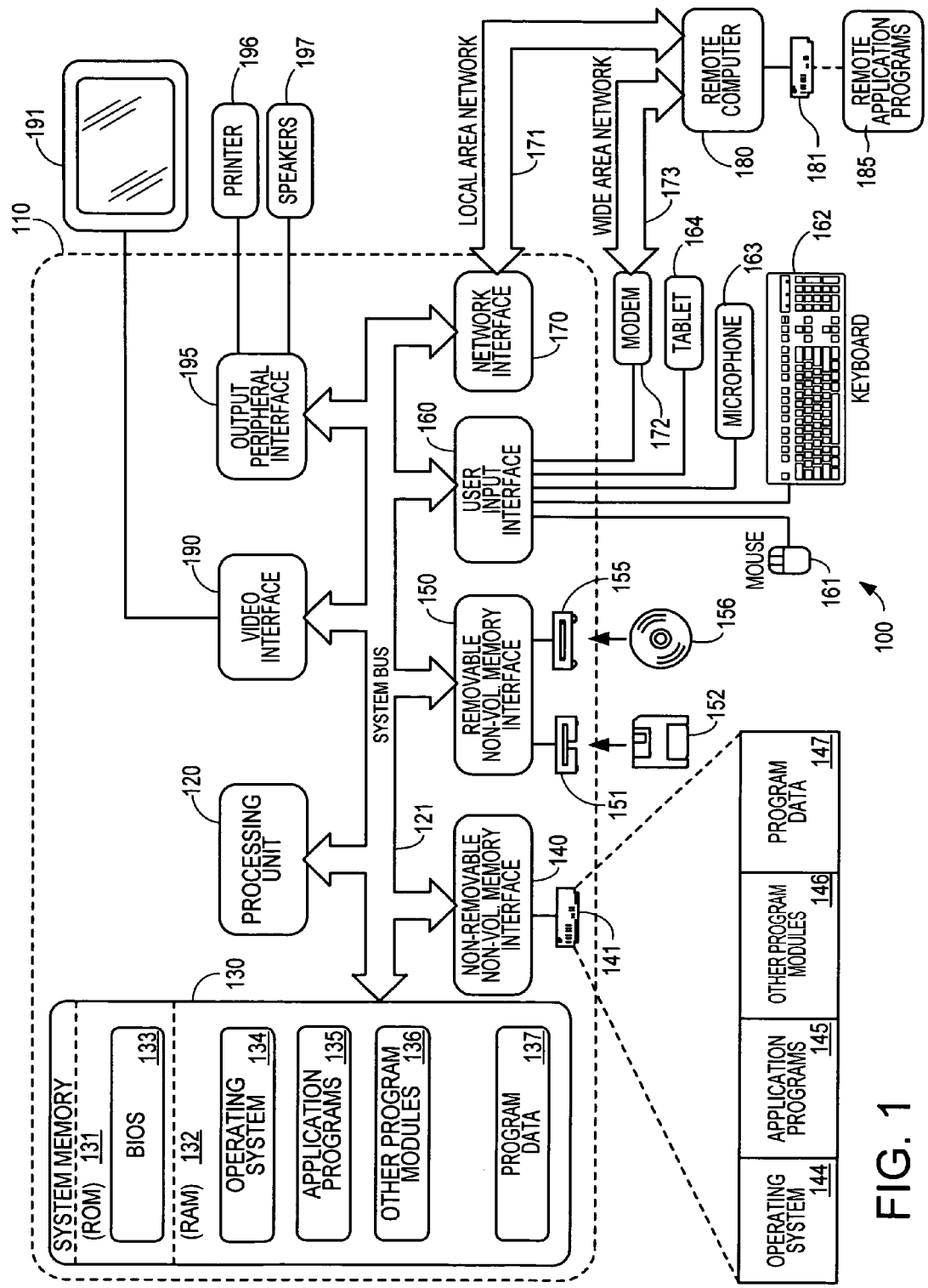
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162, a pointing device 161, commonly referred to as a mouse, trackball or touch pad, a microphone 163, and a tablet or electronic digitizer 164. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, the computer system 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

The Simple Mail Transfer Protocol (SMTP) with an Exchange server shall be used to describe the invention. Exchange is an e-mail server produced by Microsoft Corporation. SMTP is the predominant email protocol used on the Internet. While SMTP and Exchange will be used, the invention may be used with other transfer protocols and mail servers. SMTP is a Transmission Control Protocol/Internet Protocol (TCP/IP) communication protocol that defines the message formats used for transfer of mail from one e-mail server such as Exchange via the Internet to another e-mail server. According to SMTP, an email message is typically sent in the following manner. A user runs an e-mail program to create an email message and the e-mail program places the message text and control information in a queue of outgoing messages. The queue is typically implemented as a collection of files accessible to the e-mail server.

The Exchange server establishes a Transmission Control Protocol (TCP) connection to the reserved SMTP port on the destination e-mail server and uses the SMTP to transfer the message across the Internet. The SMTP session between the sending and receiving servers results in the message being transferred from a queue on the sending host to a queue on the receiving host in stages. The stages range from the sending server providing the IP address of the connection being established to receiving all the message headers and message content. When the message transfer is completed, the receiving server closes the TCP connection used by SMTP, the sending host removes the message from its mail queue, and the recipient uses his configured e-mail program to read the message in the mail queue.

Figure 2:
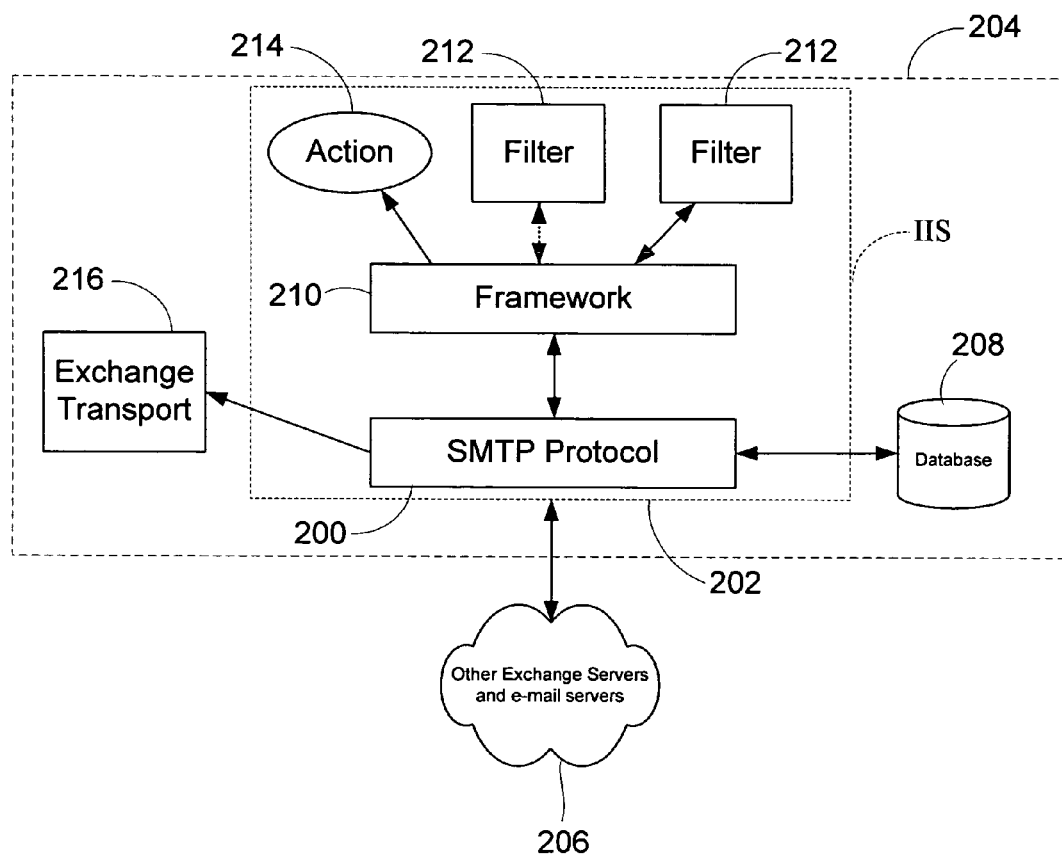
FIG. 2 is a block diagram generally illustrating the framework of the present invention in a system using a SMTP protocol stack.

Turning now to FIG. 2, the SMTP stack 200 runs inside the Internet information server (IIS) 202, which is web server software sold by Microsoft Corporation installed on server 204. The IIS 202 communicates via SMTP to other Exchange servers 206 or SMTP servers (not shown) on the Internet. The IIS 202 has a database 208 that is used to store outgoing or incoming messages. When a connection is established to the SMTP protocol 200 for a message coming in, an event is fired and received by the framework 210. The framework 210 intercepts the message and passes it to one or more filters 212. The filter 212 analyzes the message, determines a confidence level that the filter 212 has that the message is spam and sends the confidence level to the framework 210. The framework 210 decides based on the confidence level whether it wants to invoke another filter 212, or an action 214. The action 214 includes dropping the connection, sending the message to the Exchange transport 216, and deleting the message. The Exchange transport 216 routes the message. It determines if the message is to be delivered to a mailbox on server 204 or if it needs to go via SMTP 200 to another server 206.

Figure 3:
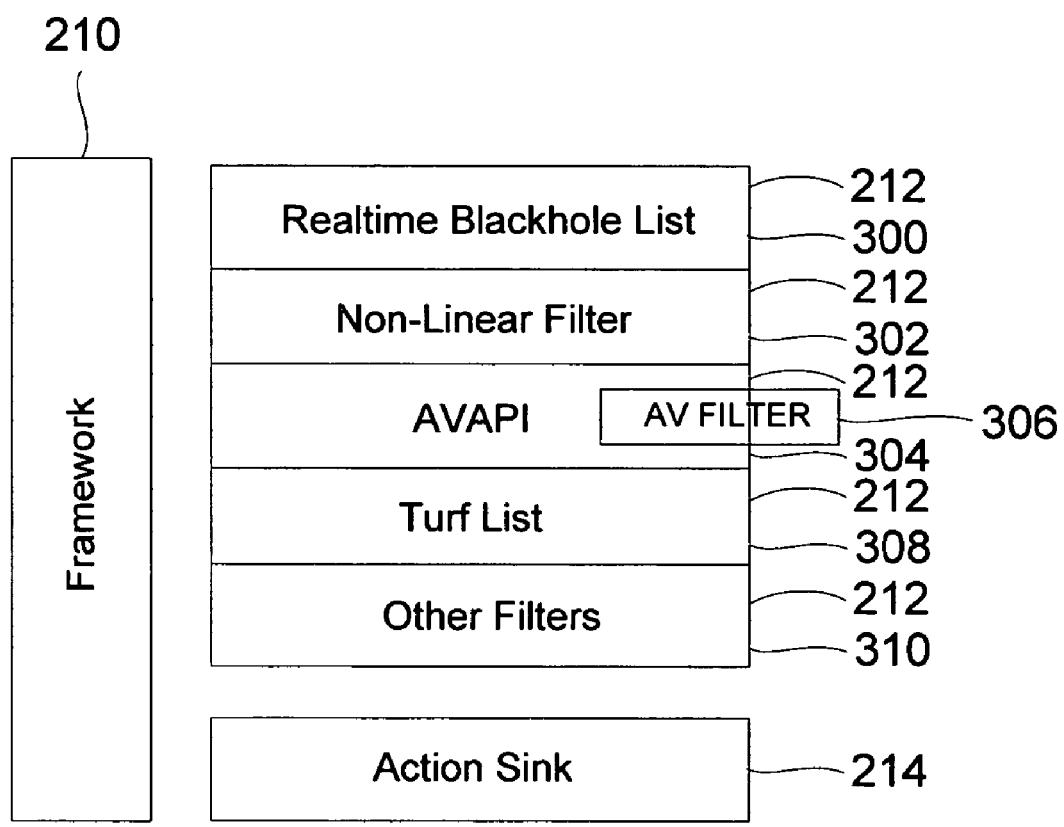
FIG. 3 is a block diagram illustrating examples of anti-spam modules used in accordance with the present invention.

Turning now to FIG. 3, the filters 212 consist of various types of anti-spam detection technologies. For example, the types of filters 212 may be a real time black hole list module 300, a non-linear module 302, an anti-virus API 304 that anti-virus modules 306 use to communicate with the Exchange server 204, a turf list module 308, and other filters 310 that use their own rules to determine if a message is spam. For example, the other filters 310 can be text classification, keyword matching, etc.

The real time black hole list module 300 compares the message sender's IP address against a known list of spam addresses. If the IP address is on the known list, the Exchange server 204 does not accept the mail. The non-linear module 302 normalizes confidence levels of filter 212 using functions such as an s-shaped curve, a Bayesian function, and the like that forces separation between spam and legitimate messages. For example, if a filter 212 returns a confidence level of 95%, the non-linear module 302 may scale the confidence level to 96% while a confidence level of 40% may be scaled to a confidence level of 30%. The turf list module 308 rejects mail during the SMTP protocol exchange between the sender and the Exchange server based on information available, including the senders mail address and/or domain, the target recipient(s) of the mail, and characteristics of the actual message body such as message id, date, subject, attachment type and name.

The framework 210 manages invocation of one or more of the anti-spam filters 212, normalizes the results of each invocation, evaluates the normalized result, and takes action on the result. The framework 210 is most typically deployed to the servers 204 at the edge of a network (i.e. the mail servers that are the first to receive emails from the Internet). Some of the technologies used, such as text classification, can be used for different uses, such as identifying importance or sensitivity of a message. As a result of this, the framework can also be usefully deployed on internal servers. The framework 210 can be used solely as a library of utilities that are invoked by existing standalone spam detection implementations to assist in migration from the standalone implementations, or more preferably as a wrapper that provides an abstraction from the underlying eventing mechanism (described below) that is used to invoke the anti-spam filters 212. The wrapper embodiment enables anti-spam filters 212 developed for email to also be used for other messaging solutions, such as Instant Messaging, determining harassment messages, etc. In either case, the framework is delivered as a library that is linked into the anti-spam technology at build or run time.

The architecture of the SMTP stack 200 in Exchange is such that events are fired by (i.e., sourced from) the stack 200 to event sinks, which are typically implemented as COM objects. When a new anti-spam technology is deployed, it implements a COM object which registers with the protocol event system at install time. The registration code is delivered by the framework 210. Installation of the framework 210 includes installing the software on the server in question, registering the event sink, enabling or disabling particular techniques for the particular server via a system administrator console, and establishing the evaluation and action strategies to be followed when spam is received. The enablement/disablement of a particular technique improves the manageability of the framework 210 by allowing all servers in a network to contain identical software binaries.

Figure 4:
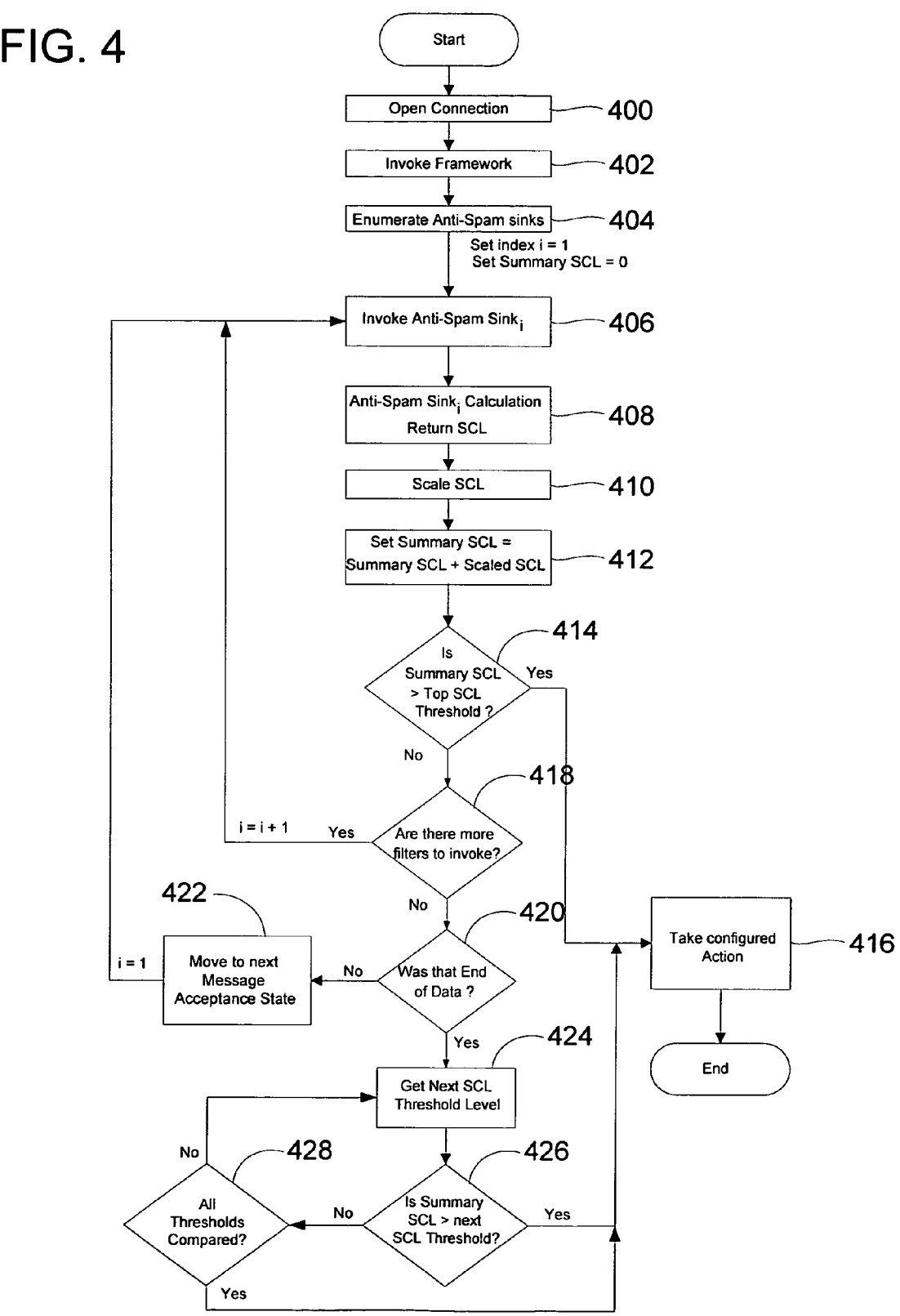
FIG. 4 is a flow chart illustrating the process of integrating anti-spam modules and determining if a message is spam.

Turning now to FIG. 4, the process of integrating the anti-spam modules 212 and determining if a message is spam is illustrated. At run time, when a connection is opened to the SMTP stack 200 (and points thereafter), an event is fired (step 400). An event dispatch system inspects its list of registrations and invokes the corresponding object. The invocation comes to the framework 210, either directly when it is acting as a wrapper, or indirectly when it is being called as a library function (step 402). In both cases, the framework 210 examines its own configuration to determine which of the anti-spam technologies 300-310 for which it has been registered has been "enabled" or "disabled" by the System Administrator. The anti-spam technologies that have been enabled are enumerated, and a summary of spam confidence levels is set to zero (step 404).

If the particular anti-spam filter 212 is "enabled," the framework 210 obtains whatever information is available for the anti-spam filter 212 to examine and sends the information to the filter 212 (step 406). The amount and type of information available will change depending at the stage of the protocol at which the filter 212 is invoked. For example, the first time invoked there may only be information about the IP address of the connection being established. At the last call before the message is accepted by the system, all the message headers and content will be available. If the framework 210 is able to crack the encoded content of the message, the framework 210 will crack the encoded content of the message into a form more readily useable by the anti-spam filter 212. When the framework is implemented as a wrapper, this information will be automatically available. When implemented as a library, the information will only be available if specifically requested by the anti-spam filter 212. Regardless of the form of the framework (i.e., wrapper or library), utility functions such as cracking the message content are invoked passively by the anti-spam filter to reduce CPU load. In one embodiment, the framework 210 also provides a lookup of recipient addresses in the message that the filter 212 may use as part of its evaluation of a piece of mail as spam.

Upon completion of its evaluation, the filter 212 passes back to the framework 210, either by return value or reference (or by calling into the framework library), an evaluation of the confidence that the solution has that the particular mail message is spam (step 408). The framework 210 typically expects an answer in the range of 0-100%, where 0% represents clearly not spam, and 100% represents clearly spam. In one embodiment, the percentage is indicated as a number between 0 and 1000. To accommodate the various anti-spam technologies 300-310 that use different measures, the framework 210 provides a scaling or tuning factor to be applied to the results from each individual filter 212 invoked to create a normalized or tuned spam confidence level (step 410). The scaling or tuning factor is configured by the administrator of the server 204. This constitutes the normalization that framework must perform in order to compare the results of different filters 212. This normalized number will be referred to as the spam confidence level. The spam confidence level is added to the summary of spam confidence levels (step 412). The framework 210 will store the calculated spam confidence level as a running sum either on the message itself for persistence and/or in memory for performance. Evaluation results of successive solutions are added to the summary of spam confidence levels.

The normalization (i.e., application of the scaling factor) can be implemented in a variety of ways. For example, one way to normalize the results is to trust the results of each filter 212 equally and simply sum the results (e.g., 0.5+0.7+ 0.8+ . . . =summary). Another way is to apply a scale to each one. For example, if the administrator likes the way a particular filter detects spam, the administrator would scale the spam confidence level of that filter by a relatively high number (e.g., 0.9). Similarly, if there is a filter that the administrator does not feel very confident about, the administrator scales the spam confidence level of that filter by a relatively low number (e.g., 0.3). Another example of a scaling factor is to use a non-linear confidence level normalization using a weighted curve such as an s-shaped curve. For example, if a filter 212 returns a spam confidence level of 95%, the scaling factor scales it higher to, for example, 96%. If the spam confidence level is in the middle of the range (e.g., 50-55%), a more radical scaling is applied to scale it lower (e.g., 30-35%).

The framework 210 provides the administrator with the ability to set several thresholds enabling the administrator to define different actions to be taken with a message based on the maximum threshold exceeded by the summary of spam confidence levels. The actions can be keeping the message from being delivered until a better idea of whether the message is spam is known, dropping the connection, sending a non-delivery message to the sender, deleting the message, passing it to another filter 212 based on the summary of spam confidence levels, sending the message to the recipient, etc. A default set of thresholds and corresponding actions is provided in the framework 210.

The summary of scaled spam confidence levels is compared to the top threshold set by the administrator (step 414). If the summary of spam confidence levels exceeds the top threshold, the action configured for the top threshold is taken (step 416). If the summary of spam confidence levels does not exceed the top threshold level and if there are more filters 212 that can be used to evaluate the message (step 418), steps 404 to 416 are repeated until either the top threshold has been exceeded or the end of the message has been received (step 420). If the end of the message has not been received, the SMTP stack 200 moves to the next message acceptance state (422) and steps 406 to 420 are repeated for the next message acceptance state. If the end of the message has been received and all of the enabled filters have analyzed the message, the summary of spam confidence levels is compared to the remaining thresholds in order from the top threshold to the bottom threshold (step 424) until the summary of spam confidence levels exceeds a threshold (step 426). If the summary of spam confidence levels exceeds a threshold, the action configured for that threshold is taken.

In summary, after a filter 212 has completed it analysis, the framework 210 evaluates the summary of spam confidence levels against a set of thresholds defined by the administrator. If the summary of spam confidence levels is greater than the highest threshold set by the administrator, then the action specified for the highest threshold is taken with the message. Otherwise, subsequent filters are used to evaluate the message until either the maximum threshold is exceeded, or all filters have evaluated the message. After all filters have evaluated the message, the summary of spam confidence levels is compared against all thresholds, and the matching threshold selected. The action associated with that threshold is then taken. For example, if the summary of spam confidence levels exceeds a 99% confidence level threshold, the message connection may be dropped silently. If the summary of spam confidence levels exceeds a 70% confidence level threshold, a non-delivery report may be returned to the sender. If the summary of spam confidence levels exceeds a 40% confidence level threshold, the message may be delivered to a "junk mail" folder in the user's mailbox. If the summary of spam confidence levels does not exceed any of the thresholds (step 428), the message may be considered legitimate and delivered to the user's inbox.

The spam confidence level for a message is propagated on the message when it is sent between servers in an organization (and between organizations). This allows for a scaled approach to handling different levels of spam. For example, gateway servers (i.e., servers at the input points of an organization) in an organization can perform destructive actions such as rejecting or deleting spam with high spam confidence level values. Alternatively, gateway servers archive messages having a high spam confidence level so that administrators can check the messages to verify operation of the anti-spam filters 212. Back end servers can perform less destructive actions for lower spam confidence level values, such as moving the message to a special junk mail folder.

Figure 5:
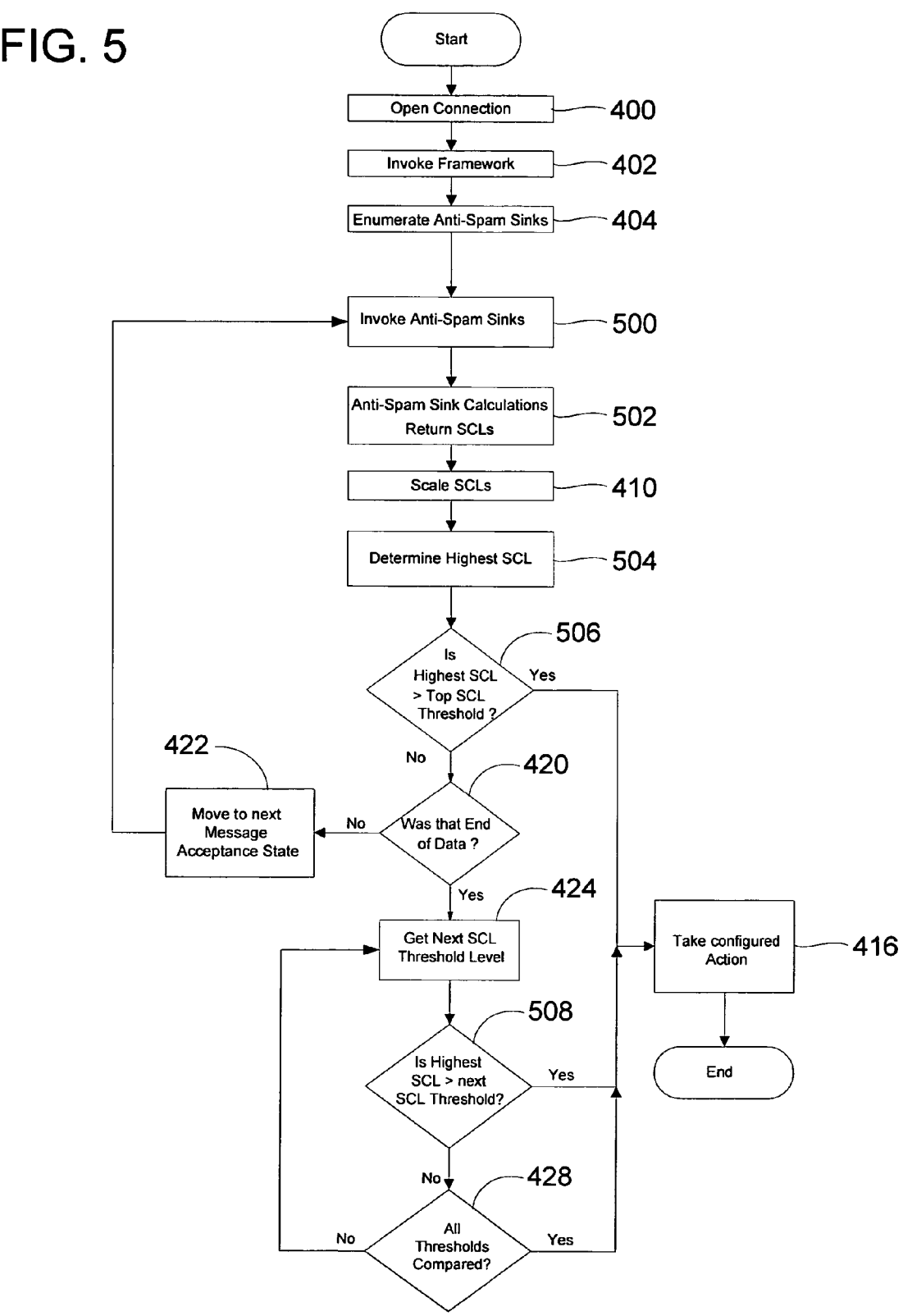
FIG. 5 is a flow chart illustrating another embodiment of integrating anti-spam modules and determining if a message is spam.

Turning now to FIG. 5, in some cases, it is difficult to determine a reasonable scaling factor between different anti-spam solutions to determine a final normalized spam confidence level. In these cases, the default algorithm for combining spam confidence level values from multiple anti-spam filters 212 is to take the highest spam confidence level value returned (after is has been scaled to the normalized range such as 0 to 9) as the final spam confidence level for the message. In this embodiment, the anti-spam filters 212 are invoked (step 500) and each anti-spam sink returns a spam confidence level (step 502). The highest spam confidence level is determined (step 504) and compared to thresholds (steps 506, 508) as described above. Note that this algorithm implies that the most aggressive anti-spam solution will always win out and has the effect that as more anti-spam filters are added, less spam mail tends to get through. Note that it is possible that an anti-spam filter 212 may be too aggressive and determine that legitimate messages are spam more often than other anti-spam filters 212. In such a situation, the spam confidence level of the anti-spam filter that is too aggressive is disabled or scaled such that the number of legitimate messages classified as spam is reduced.

At all points, the actions taken with a particular message can be logged or added to a message tracking table, depending on the level of information that the administrator chooses to record. A default set of actions is available to the administrator with the framework 210. Additional actions may be added by delivering additional action execution code in a manner similar to that used to deploy new anti-spam filters.

Any message accepted for delivery to a mailbox by the framework 210 will have the summary of spam confidence levels of that message stored on it in a well-known property. A delivery agent processing the message may choose to evaluate this property as part of its own logic. A client viewing the message, or a table of such messages, may choose to list the messages in ascending or descending order of the summary of spam confidence levels, as an aid to identifying those messages that may have been miscalculated.

It can be seen that a platform to enable spam and viruses to be detected and handled at the edge of the network boundary using a variety of existing and future anti-spam filters and technologies has been described. The platform enables the solutions and technologies to interact and be managed in a rational way, thereby providing the ability to deploy rapid innovation on the server side in the warlike environment of detecting spam.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of determining if a message is spam in a system having a plurality of anti-spam modules comprising the steps of:
    invoking a plurality of the plurality of anti-spam modules;
    receiving a spam confidence level from each of the plurality of the plurality of anti-spam modules;
    determining a highest spam confidence level from the spam confidence levels;
    comparing the highest spam confidence level to at least one threshold; and
    invoking an action associated with the at least one threshold if the highest spam confidence level is greater than the at least one threshold, said associated action comprising at least one of the following:
        dropping a connection if the highest spam confidence level exceeds a first threshold level;
        returning a non-delivery message to a sender if the highest spam confidence level exceeds a second threshold level and is below the first threshold level; and
        delivering the message to a junk mail folder if the highest spam confidence level exceeds a third threshold level and is below the second threshold level.

2. The method of claim 1 further comprising the step of applying a tuning factor to at least one spam confidence level to create at least one tuned spam confidence level and wherein the step of determining a highest spam confidence level comprises the step of determining the highest of the at least one tuned spam confidence level and the spam confidence levels that had the tuning factor applied.

3. The method of claim 2 wherein the step of applying a tuning factor comprising tuning the at least one spam confidence level by a user's confidence level in the anti-spam module associated with the at least one spam confidence level.

4. The method of claim 1 further comprising the step of scaling each spam confidence level to a normalized range.

5. The method of claim 4 wherein the normalized range is 0 to 9.

6. The method of claim 1 further comprising the step of adding the spam confidence level to the message.

7. The method of claim 1 wherein the at least one threshold comprises a plurality of thresholds including a top threshold and a bottom threshold, the method further comprising the steps of:
    comparing the highest spam confidence level to each of the plurality of thresholds;
    determining if the highest spam confidence level is higher than at least one of the plurality of thresholds;
    if the highest spam confidence level is higher than at least one of the plurality of thresholds:
        determining which of the at least one of the plurality of thresholds is closest to the top threshold; and
        invoking the action associated with the at least one of the plurality of thresholds that is closest to the top threshold.

8. The method of claim 1 wherein the step of invoking the action includes invoking one of deleting the message, sending a non-delivery notification, archiving the message, and passing the message to a client with the highest spam confidence level.

9. The method of claim 1 wherein the first threshold is a ninety nine percent spam confidence level, the second threshold is a seventy percent spam confidence level, and the third threshold level is a forty percent spam confidence level.

10. The method of claim 1 further comprising the step of logging the associated action taken with the message.

11. A computer-readable storage medium having computer executable instructions for determining if a message is spam in a system having a plurality of anti-spam modules, the instructions comprising the steps of:
    receiving a spam confidence level from each of a plurality of the plurality of anti-spam modules;
    determining a highest spam confidence level;
    comparing the highest spam confidence level to at least one threshold; and
    invoking an action associated with the at least one threshold if the highest spam confidence level is greater than the at least one threshold, said associated action comprising at least one of the following:
        dropping a connection if the highest spam confidence level exceeds a first threshold level;
        returning a non-delivery message to a sender if the highest spam confidence level exceeds a second threshold level and is below the first threshold level; and
        delivering the message to a junk mail folder if the highest spam confidence level exceeds a third threshold level and is below the second threshold level.

12. The computer-readable storage medium of claim 11 having further computer-executable instructions for performing the step of applying a tuning factor to at least one spam confidence level to create at least one tuned spam confidence levels and wherein the step of determining a highest spam confidence level comprises the step of determining the highest of the at least one tuned spam confidence level and the spam confidence levels that had the tuning factor applied.

13. The computer-readable storage medium of claim 12 wherein the step of applying a tuning factor comprising tuning the at least one spam confidence level by a user's confidence level in the anti-spam module associated with the at least one spam confidence level.

14. The computer-readable storage medium of claim 11 having further computer-executable instructions for performing the step of scaling each spam confidence level to a normalized range.

15. The computer-readable storage medium of claim 14 wherein the normalized range is 0 to 9.

16. The computer-readable storage medium of claim 11 having further computer-executable instructions for performing the step of adding the spam confidence level to the message.

17. The computer-readable storage medium of claim 11 wherein the at least one threshold comprises a plurality of thresholds including a top threshold and a bottom threshold, the computer-readable medium having further computer-executable instructions for performing the steps of:
    comparing the highest spam confidence level to each of the plurality of thresholds;
    determining if the highest spam confidence level is higher than at least one of the plurality of thresholds;
    if the highest spam confidence level is higher than at least one of the plurality of thresholds:

determining which of the at least one of the plurality of thresholds is closest to the top threshold; and invoking the action associated with the at least one of the plurality of thresholds that is closest to the top threshold.

18. The computer-readable storage medium of claim 11 wherein the step of invoking the action includes invoking one of deleting the message, sending a non-delivery notification, archiving the message, and passing the message to a client with the highest spam confidence level.

19. The computer-readable storage medium of claim 11 wherein the first threshold is a ninety nine percent spam confidence level, the second threshold is a seventy percent spam confidence level, and the third threshold level is a forty percent spam confidence level.

20. The computer-readable storage medium of claim 11 having further computer-executable instructions for performing the steps of logging the associated action taken with the message.

21. The computer-readable storage medium of claim 11 having further computer-executable instructions for performing the steps of invoking the plurality of the plurality of anti-spam modules.

22. The computer-readable storage medium of claim 21 wherein the step of invoking the plurality of the plurality of anti-spam modules includes the step of providing a list of recipient addresses in the message.

23. The computer-readable storage medium of claim 11 having further computer executable instructions for performing the step comprising cracking an encoded content of the message.

* * * * *